United States Patent
Budhiraja et al.

(10) Patent No.: US 9,818,210 B2
(45) Date of Patent: Nov. 14, 2017

(54) PIXEL-ALIGNED DRAWING TO AVOID ANTI-ALIASING

(75) Inventors: Rajesh Budhiraja, Noida (IN); Paresh Goel, Noida (IN); David Gideon Macy, Pacifica, CA (US); Kallol Acharya, Noida (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 1138 days.

(21) Appl. No.: 12/501,302

(22) Filed: Jul. 10, 2009

(65) Prior Publication Data

US 2013/0093784 A1  Apr. 18, 2013

(51) Int. Cl.
*G06T 11/40* (2006.01)
*G06T 5/00* (2006.01)

(52) U.S. Cl.
CPC ........... *G06T 11/40* (2013.01); *G06T 5/002* (2013.01); *G06T 2200/12* (2013.01)

(58) Field of Classification Search
CPC ....... G06T 5/002–5/003; G06T 11/20–11/203; G06T 2200/12
USPC ................................. 345/611–616
See application file for complete search history.

(56) References Cited

U.S. PATENT DOCUMENTS

| | | | |
|---|---|---|---|
| 5,129,051 A * | 7/1992 | Cain | G06T 17/20 345/423 |
| 5,940,080 A | 8/1999 | Ruehle et al. | |
| 2003/0229856 A1* | 12/2003 | Lynn et al. | 715/517 |
| 2004/0151377 A1* | 8/2004 | Boose | G06K 9/00476 382/193 |
| 2007/0188497 A1* | 8/2007 | Dowling et al. | 345/469 |
| 2008/0030525 A1* | 2/2008 | Ramchandani et al. | 345/677 |
| 2008/0062204 A1* | 3/2008 | Ramchandani et al. | 345/677 |

OTHER PUBLICATIONS

Bill Spitzak, "Drawing diagonal lines with antialiasing off," Oct. 2005, Cairo Mailing List, http://lists.cairographics.org/archives/cairo/2005-October/005533.html.
"ActionScript 3.0 Language and Components Reference: PixelSnapping", Feb. 2008, Adobe Systems Inc., http://www.few.vu.nl/~eliens/research/assets/flex3/langref/flash/display/PixelSnapping.html.
Lee, "Shading of Regions on Vector Display Devises", Computer Graphics, vol. 15, Iss. 3, pp. 37-44 (Aug. 1981).

* cited by examiner

*Primary Examiner* — Aaron M Richer
(74) *Attorney, Agent, or Firm* — Finch & Maloney PLLC

(57) ABSTRACT

A method, system, and computer-readable storage medium are disclosed for boundary-aligned anti-aliasing. In one embodiment, artwork input comprising a first set of one or more graphical elements and a second set of one or more graphical elements may be received. The first set may comprise at least one horizontal or vertical line segment. Each graphical element in the first set of one or more graphical elements may be automatically aligned to pixel boundaries based on a pixel resolution of a target imaging device. An anti-aliasing function may be applied to generate a selectively anti-aliased artwork based on the artwork input. Applying the anti-aliasing function may comprise applying anti-aliasing effects to the second set of one or more graphical elements and not to the first set of one or more graphical elements. The selectively anti-aliased artwork may be displayed on the target imaging device.

24 Claims, 5 Drawing Sheets

PIXEL-ALIGNED DRAWING TO AVOID ANTI-ALIASING

BACKGROUND

Description of Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, paths, polygons, Bézier curves, and text characters) may be based upon mathematical equations to represent parts of vector graphics data in digital images. The geometric objects may typically be located in two-dimensional or three-dimensional space. A three-dimensional object may be represented in two-dimensional space for the purposes of displaying or editing the object.

To be displayed on raster-based imaging devices (e.g., most displays and printers), vector graphics data may be converted to raster graphics data. Such a conversion may result in artifacts referred to as aliasing. Aliasing artifacts are commonly described as "jaggies" or "stair steps." Anti-aliasing techniques are intended to minimize such artifacts.

SUMMARY

Various embodiments of systems, methods, and computer-readable storage media for boundary-aligned anti-aliasing are disclosed. In one embodiment, artwork input comprising a first set of one or more graphical elements and a second set of one or more graphical elements may be received. The first set may comprise at least one horizontal or vertical line segment. The second set of one or more graphical elements may comprise one or more other objects such as at least one curve or diagonal line segment. Each graphical element in the first set of one or more graphical elements may be automatically aligned to pixel boundaries based on a pixel resolution of a target imaging device (e.g., a display). In one embodiment, the alignment may comprise adjusting the anchor points of each object (e.g., a horizontal line segment or vertical line segment) so that the stroke boundaries of the object (e.g., as defined by a stroke width) are aligned to the pixel boundaries of the target imaging device.

An anti-aliasing function may be applied to generate a selectively anti-aliased artwork based on the artwork input. Applying the anti-aliasing function may comprise applying anti-aliasing effects to the second set of one or more graphical elements and not to the first set of one or more graphical elements. The selectively anti-aliased artwork in the resulting image may thus comprise both non-anti-aliased, hard-edged elements (e.g., the horizontal and/or vertical line segments for which anti-aliasing was essentially bypassed) and anti-aliased, soft-edged elements (e.g., any curves, diagonal line segments, etc., for which anti-aliasing was performed). The selectively anti-aliased artwork may be displayed on the target imaging device.

Figure 1:
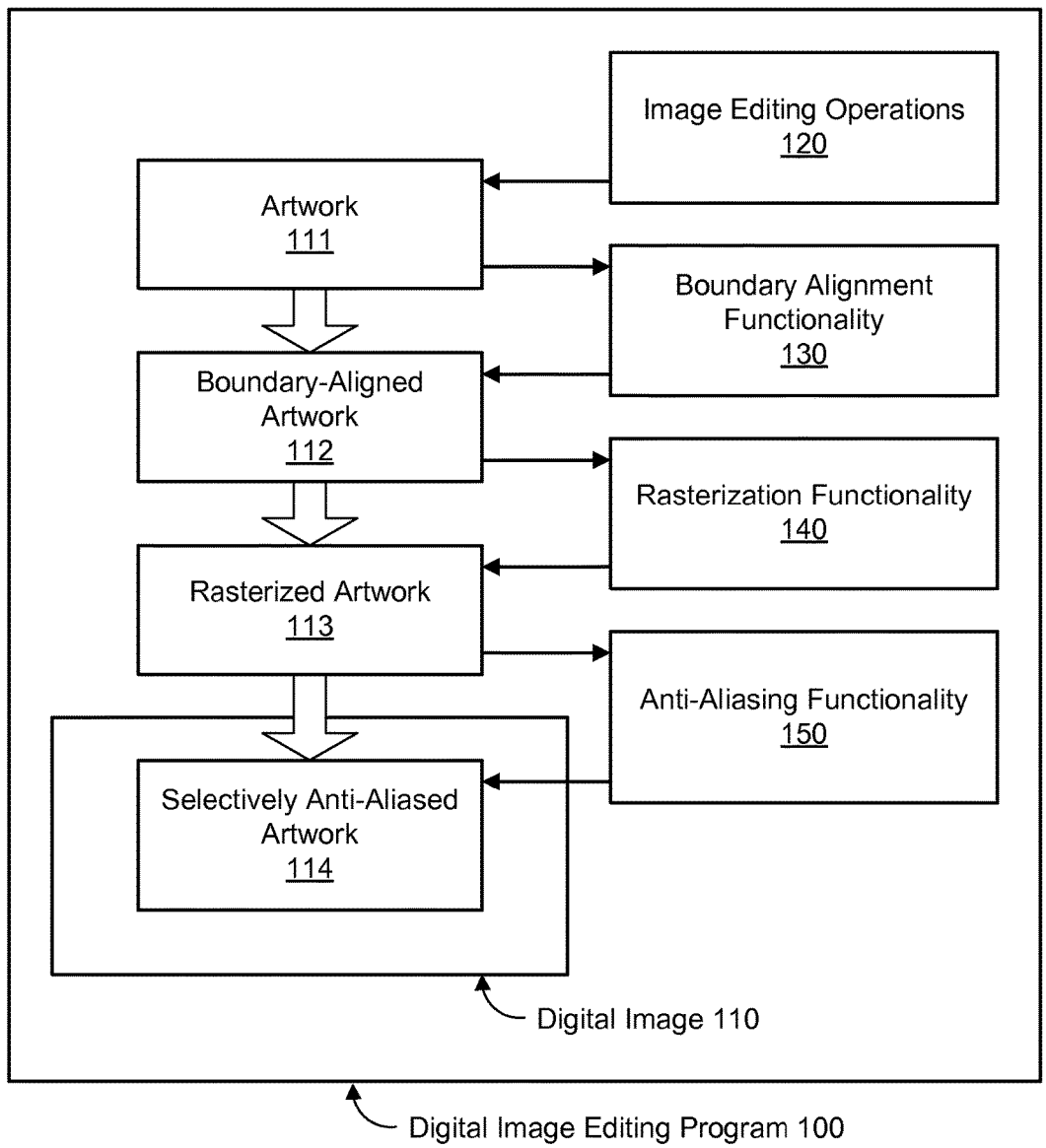
FIG. 1 is a block diagram illustrating an embodiment of a digital image editing program configured for boundary-aligned anti-aliasing.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Using embodiments of the systems and methods described herein, boundary-aligned anti-aliasing may be performed on a computer system. In one embodiment, the anchor points of a suitable object (e.g., a horizontal line segment or vertical line segment) may be modified so that the stroke boundaries of the object (e.g., as defined by a stroke width having the object's path at its center) are aligned to pixel boundaries of a target imaging device (e.g., a display). In one embodiment, an anchor point may be shifted by a maximum of 0.5 pixels in the horizontal and/or vertical direction during the boundary alignment process.

FIG. 1 is a block diagram illustrating an embodiment of a digital image editing program 100 configured for use with the boundary-aligned anti-aliasing techniques described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Illustrator®, Adobe Photoshop®, or Adobe AfterEffects® (available from Adobe Systems Inc.) may be used as the image editor 100.

Using the image editor 100, a user may include artwork 111 in the digital image 110. The artwork 111 may be created and/or edited using the image editing operations 120. The artwork 111 may also be referred to herein as artwork input 111. In one embodiment, the artwork 111 may include vector graphics data. Vector graphics data may be stored and manipulated as one or more geometric objects built with geometric primitives. The geometric primitives (e.g., points, line segments, paths, polygons, Bézier curves, and text characters) may be based upon mathematical equations to represent parts of vector graphics data in the artwork 111. As will be described in greater detail below, boundary alignment functionality 130 may be applied to the artwork 111 to generate boundary-aligned artwork 112. In one embodiment, the stroke of horizontal line segments and vertical line segments in the artwork 111 may be aligned to pixel boundaries by the boundary alignment functionality 130. In one embodiment, the boundary alignment functionality 130 may be applied to the artwork 111 prior to the application of the rasterization functionality 140. In one embodiment, the boundary alignment functionality 130 may be applied to the artwork 111 prior to the application of the anti-aliasing functionality 150.

To display the artwork 111 as part of the digital image 110 on a target imaging device (e.g., a raster-based monitor or printer), rasterization functionality 140 may be applied to the boundary-aligned artwork 112 to generate rasterized artwork 113. The rasterized artwork 113 may comprise at least one bitmap, and the bitmap may be representative of the boundary-aligned artwork 112. In various embodiments, any suitable rasterization technique(s) may be used to convert the boundary-aligned artwork 112 to the rasterized artwork 113. In some embodiments, in addition to the vector graphics data, the artwork 111 and boundary-aligned artwork 112 may comprise raster graphics data for which further rasterization is unnecessary. In an alternate embodiment, the boundary alignment functionality 130 may be applied to rasterized artwork 113 created directly from the original artwork 111. In other words, the boundary alignment functionality 130 may be applied after the rasterization functionality 140 in an alternate embodiment.

In one embodiment, anti-aliasing functionality 150 may be applied to the rasterized artwork 113 to generate anti-aliased artwork 114 (also referred to herein as selectively anti-aliased artwork 114). In various embodiments, any suitable anti-aliasing technique(s) (e.g., any suitable technique(s) for minimizing aliasing) may be used to implement the anti-aliasing functionality 150. Various types of anti-aliasing such as "sharp," "crisp," "strong," and "smooth" may be applied by modifying parameters associated with the anti-aliasing technique(s).

In one embodiment, the anti-aliasing function may ignore or bypass horizontal and vertical line segments (e.g., of the boundary-aligned strokes) that are aligned to pixel boundaries. Thus, the application of the boundary alignment functionality 130 to the artwork 111 may later result in a selective application of anti-aliasing effects using the anti-aliasing functionality 150. Thus, while the anti-aliasing functionality 150 may use the entire rasterized artwork 113 as input, the anti-aliasing functionality 150 may alter some portions of the rasterized artwork 113 (e.g., by using any suitable anti-aliasing technique(s)) while leaving other portions of the rasterized artwork 113 essentially unchanged. For example, horizontal line segments and vertical line segments may retain a "crisp" or "hard-edged" (i.e., non-anti-aliased) appearance in the selectively anti-aliased artwork 114 after being aligned to pixel boundaries by the boundary alignment functionality 130. However, anti-aliasing effects may be applied to other elements of the artwork 111, such as curves and diagonal line segments, to yield a "smooth" or "soft-edged" look. The selectively anti-aliased artwork 114 in the resulting image 110 may thus comprise both hard-edged elements (e.g., the horizontal and/or vertical line segments for which anti-aliasing was essentially bypassed) and soft-edged elements (e.g., any curves, diagonal line segments, etc., for which anti-aliasing was performed).

The boundary alignment functionality 130, rasterization functionality 140, and anti-aliasing functionality 150 may comprise program instructions executable on a computer system adapted for boundary-aligned anti-aliasing. The program instructions may be executable using a central processing unit (CPU) and/or graphics processing unit (GPU). In some embodiments, various parameters used in the operation of the boundary alignment functionality 130, rasterization functionality 140, and/or anti-aliasing functionality 150 may be selected by retrieving default values, by retrieving previously stored values, by automatically generating suitable values, and/or by accepting relevant user input.

Figure 2:
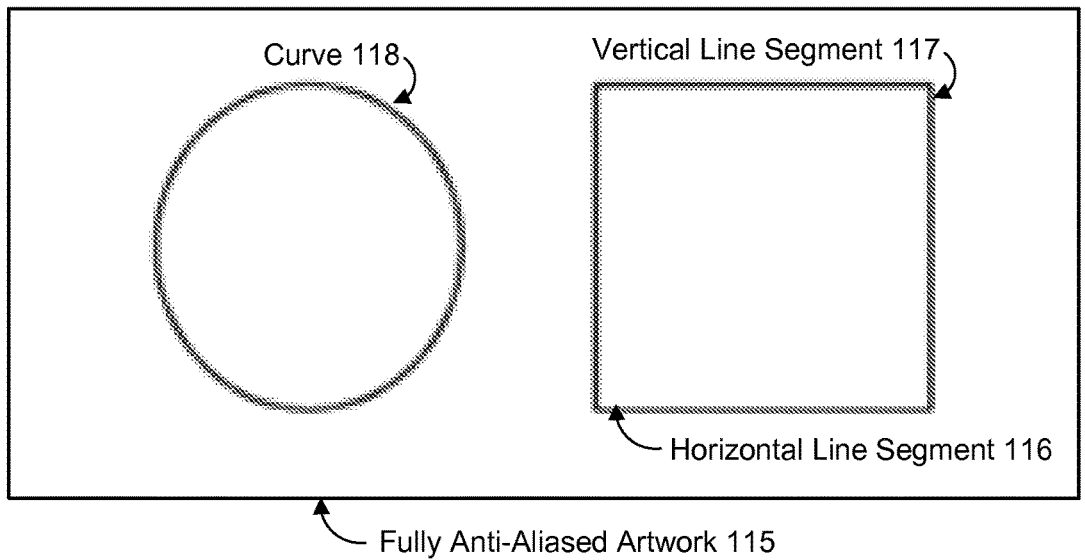
FIG. 2 illustrates an example of selectively anti-aliased artwork resulting from boundary-aligned anti-aliasing according to one embodiment.
Figure 2:
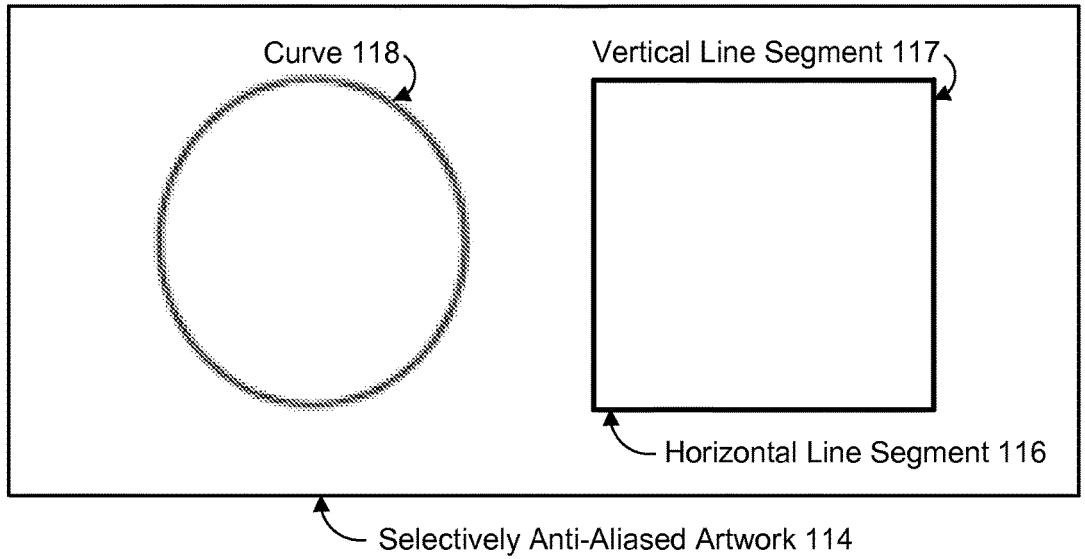

FIG. 2 illustrates an example of selectively anti-aliased artwork resulting from boundary-aligned anti-aliasing according to one embodiment. An example of fully anti-aliased artwork 115 may be produced using conventional anti-aliasing techniques. An example of a selectively anti-aliased artwork 114, having the same graphical elements as the example of the fully anti-aliased artwork 115, may be produced using the boundary-aligned anti-aliasing techniques discussed herein. In the example of the selectively anti-aliased artwork 114, anti-aliasing effects have been applied to curve(s) 118 but not to horizontal and vertical line segments 116 and 117, respectively.

Figure 3:
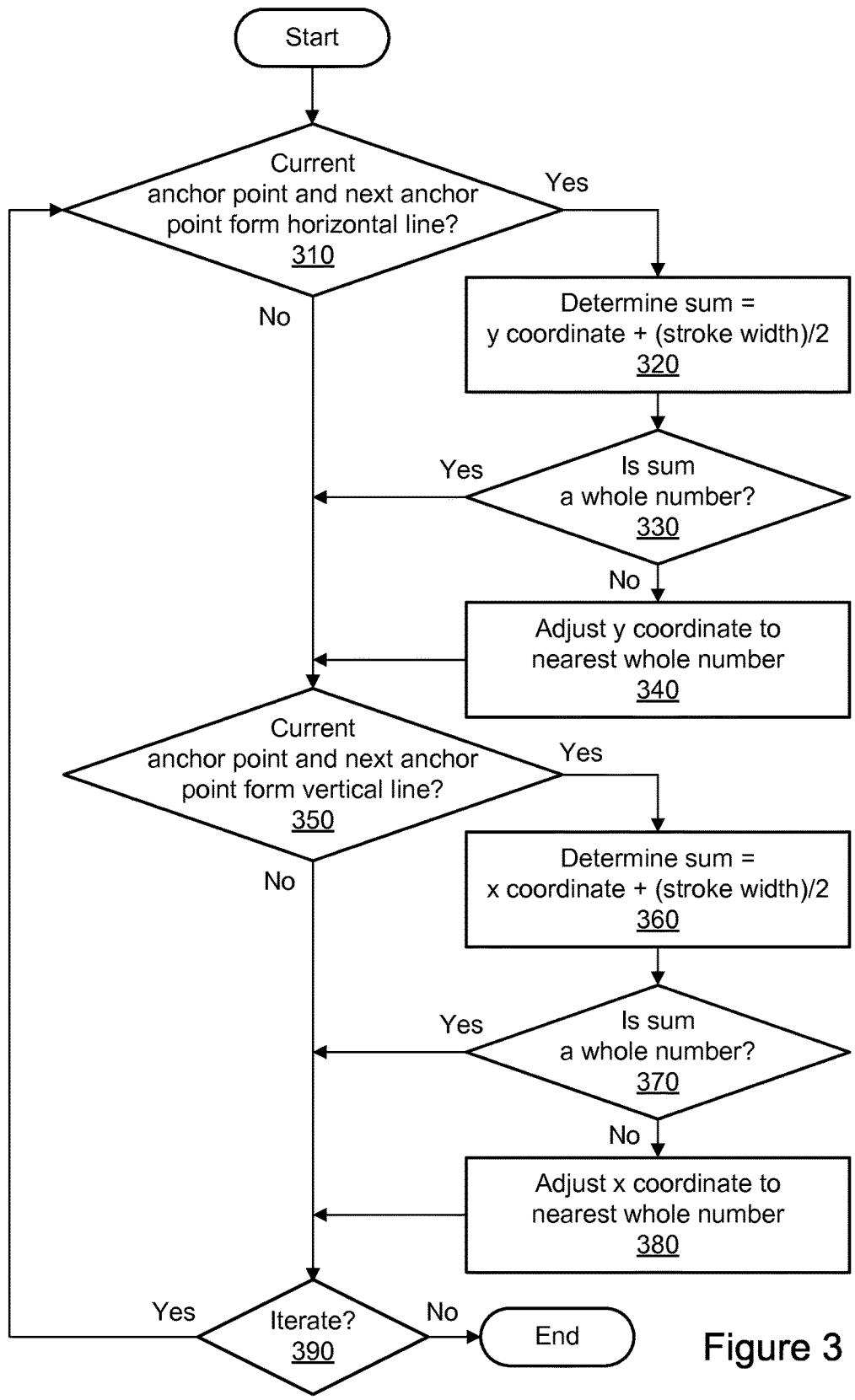
FIG. 3 is a flowchart illustrating a method for boundary-aligned anti-aliasing according to one embodiment.

FIG. 3 is a flowchart illustrating a method for boundary-aligned anti-aliasing according to one embodiment. In one embodiment, each object in the artwork 111 may be processed as follows. In another embodiment, each object in the artwork 111 that has been selected for potential boundary alignment may be processed as follows. The boundary alignment functionality 130 may traverse the objects to be processed using suitable techniques such as iteration or recursion. Traversing the objects may comprise traversing the anchor points of the objects. As shown in 310, for each anchor point to be processed, the boundary alignment functionality 130 may determine if the current anchor point and the next anchor point form a horizontal line. In one embodiment, the next anchor point may be determined by iterating through a list of anchor points in the artwork 111. The determination in 310 may be made based on two consecutive anchor points in a line segment having the same y coordinate. Throughout FIG. 3, the coordinate system may be based on the resolution of the target imaging device in pixels. In one embodiment, the coordinate system of the artwork 111 may be mapped to a coordinate system (e.g., pixel resolution) of the target imaging device prior to performing the operations shown in FIG. 3.

If a horizontal line was found between consecutive anchor points, then, as shown in 320, a sum equaling the y coordinate of the anchor points plus half the stroke width of the line segment may be determined. As shown in 330, it may be determined whether the sum determined in 320 is a whole number. As shown in 340, if the sum is not a whole number, then the y coordinate of the consecutive anchor points may be set to the nearest whole number, thus aligning or "nudging" the horizontal line to a pixel boundary.

As shown in 350, for each anchor point to be processed, the boundary alignment functionality 130 may determine if the current anchor point and the next anchor point form a vertical line. In one embodiment, the next anchor point may be determined by iterating through a list of anchor points in the artwork 111. The determination in 350 may be made based on two consecutive anchor points in a line segment having the same x coordinate.

If a vertical line was found between consecutive anchor points, then, as shown in 360, a sum equaling the x coordinate of the anchor points plus half the stroke width of the line segment may be determined. As shown in 370, it may be determined whether the sum determined in 360 is a whole number. As shown in 380, if the sum is not a whole number, then the x coordinate of the consecutive anchor points may be set to the nearest whole number, thus aligning or "nudging" the vertical line to a pixel boundary.

In one embodiment, the boundary alignment functionality 130 may consider several parameters in determining whether to align an object. The parameters may comprise, for example, the coordinates of the object (e.g., the coordinates of a line segment or Bézier segment), the stroke width of the object, the stroke alignment of the object (e.g., center-aligned, inside-aligned, outside aligned), and any vector effects applied to the object. Paths resulting from vector effects (e.g., a drop shadow effect) may also be considered for alignment. For example, consider a line segment for which the anchor points in pixel coordinates are at (50, 100) and (70, 100), the stroke alignment is center-aligned, and the stroke width is 1 pixel. In this example, the boundary alignment functionality 130 may adjust the coordinates of the anchor points to (50.5, 100) and (70.5, 100). Due to the adjustment, the stroke boundaries will align with pixel boundaries, thus eliminating any need for anti-aliasing on this line segment if a "hard-edged" appearance is sought.

In one embodiment, the boundary alignment functionality 130 may be applied automatically to all suitable graphical elements in the artwork 111 (e.g., horizontal or vertical line segments). In one embodiment, the boundary alignment functionality 130 may be applied selectively to individual graphical elements in the artwork 111. For example, a user may select some or all of the vector graphical data in the artwork 111 (e.g., one or more horizontal or vertical line segments) and then invoke the boundary alignment functionality 130 on the selected objects. In one embodiment, the boundary alignment functionality 130 may be invoked by selecting an appropriate menu item or other interface item enabled by a plug-in module. The menu item or other interface item in the image editor 100 may have a suitable name such as "Nudging." On invocation of the menu item, the boundary alignment functionality 130 may automatically traverse the selected objects and automatically perform the boundary alignment on each of the selected objects.

In one embodiment, objects created in the artwork 111 by the user may be boundary-aligned as soon as they are created (e.g., using the image editing operations 120). After the boundary alignment functionality 130 determines that the new object (e.g., a horizontal line segment or a vertical line segment ) is suitable for alignment using the techniques discussed herein, the boundary alignment functionality 130 may modify the anchor points of the new object so that they "snap to" pixel coordinates. When a stroke is applied, the position of the anchor points may be adjusted so that the boundaries of the stroke are aligned with pixel boundaries. The boundary alignment functionality 130 as applied to the new object may be based on parameters such as the coordinates of the object (e.g., the coordinates of a Bézier segment), the stroke width of the object, the stroke alignment of the object (e.g., center-aligned, inside-aligned, outside aligned), and any vector effects applied to the object. Paths resulting from vector effects (e.g., a drop shadow effect) may also be considered for alignment.

In one embodiment, the boundary alignment functionality 130 may be applied directly to an object that has no style applied to it. If a style has been applied, then the boundary alignment functionality 130 may operate on the styled art of the object (i.e., the modification to the object resulting from the style). In one embodiment, the boundary alignment functionality 130 may ignore or bypass objects whose stroke color is a pattern. In one embodiment, the boundary alignment functionality 130 may be applied only to objects whose stroke color is a solid color.

In one embodiment, the boundary alignment functionality 130 may be exposed via a public suite API (application programming interface). The API may take as input a list of handles of the relevant objects to be aligned to pixel boundaries. In one embodiment, the boundary alignment functionality 130 may operate on art objects having the type kPathArt, kCompoundPathArt, kGroupArt, and/or kPluginArt. For application to newly created objects, the tool or plug-in used to create the new object (e.g., the rectangle tool, line tool, pen tool, arc tool, etc.) may invoke the boundary alignment API on objects created during the drag loop of the tool.

Figure 4:
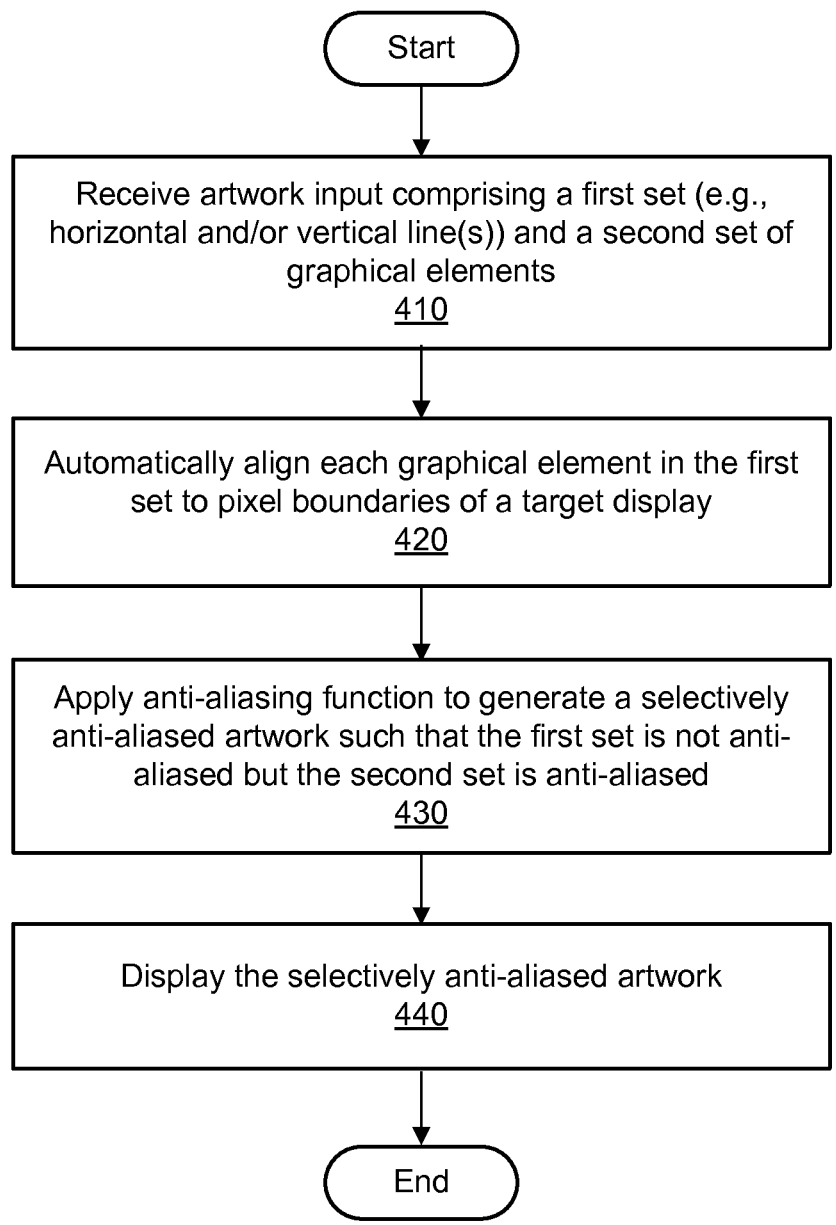
FIG. 4 is a flowchart illustrating a method for boundary-aligned anti-aliasing according to one embodiment.

FIG. 4 is a flowchart illustrating a method for boundary-aligned anti-aliasing according to one embodiment. As shown in 410, artwork input may be received (e.g., at a module of an image editor 100). The artwork input may comprise a first set of one or more graphical elements and a second set of one or more graphical elements. The first set may comprise one or more objects for which anti-aliasing is not desired, and the second set may comprise one or more objects for which anti-aliasing is desired. The first set of one or more graphical elements may comprise at least one horizontal or vertical line segment. The second set of one or more graphical elements may comprise one or more other objects such as at least one curve or diagonal line segment. The terms "graphical element" and "object" may be used interchangeably herein.

As shown in 420, each graphical element in the first set of one or more graphical elements may be automatically aligned to pixel boundaries based on a pixel resolution of a target display. In one embodiment, the alignment may comprise adjusting the anchor points of each object (e.g., a horizontal line segment or vertical line segment) so that the stroke boundaries of the object (e.g., as defined by a stroke width) are aligned to the pixel boundaries of the target display. In one embodiment, an anchor point may be shifted by a maximum of 0.5 pixels in the horizontal and/or vertical direction during the boundary alignment process.

As shown in 430, an anti-aliasing function may be applied to generate a selectively anti-aliased artwork based on the artwork input. The anti-aliasing function may ignore horizontal and vertical line segments (e.g., of the boundary-aligned strokes) that are aligned to pixel boundaries. Thus, applying the anti-aliasing function may comprise applying anti-aliasing effects to the second set of one or more graphical elements and not to the first set of one or more graphical elements. In this manner, horizontal line segments and vertical line segments may retain a "crisp" or "hard-edged" (i.e., non-anti-aliased) appearance in the selectively anti-aliased artwork while other elements of the artwork input, such as curves and diagonal line segments, may be anti-aliased to yield a "smooth" or "soft-edged" look. The selectively anti-aliased artwork in the resulting image may thus comprise both hard-edged elements (e.g., the horizontal and/or vertical line segments for which anti-aliasing was essentially bypassed) and soft-edged elements (e.g., any curves, diagonal line segments, etc., for which anti-aliasing was performed). As shown in 440, the selectively anti-aliased artwork may be displayed on the target display.

The receiving function used in the operation shown in 410 may be performed by a receiving module implemented by program instructions stored in a computer-readable storage medium and executable by one or more processors (e.g., one or more CPUs or GPUs). The aligning function used in the operation shown in 420 may be performed by an aligning module implemented by program instructions stored in a computer-readable storage medium and executable by one or more processors (e.g., one or more CPUs or GPUs). The anti-aliasing function used in the operation shown in 430 may be performed by a anti-aliasing module implemented by program instructions stored in a computer-readable storage medium and executable by one or more processors (e.g., one or more CPUs or GPUs). The displaying function used in the operation shown in 440 may be performed by a displaying module implemented by program instructions stored in a computer-readable storage medium and executable by one or more processors (e.g., one or more CPUs or GPUs).

Figure 5:
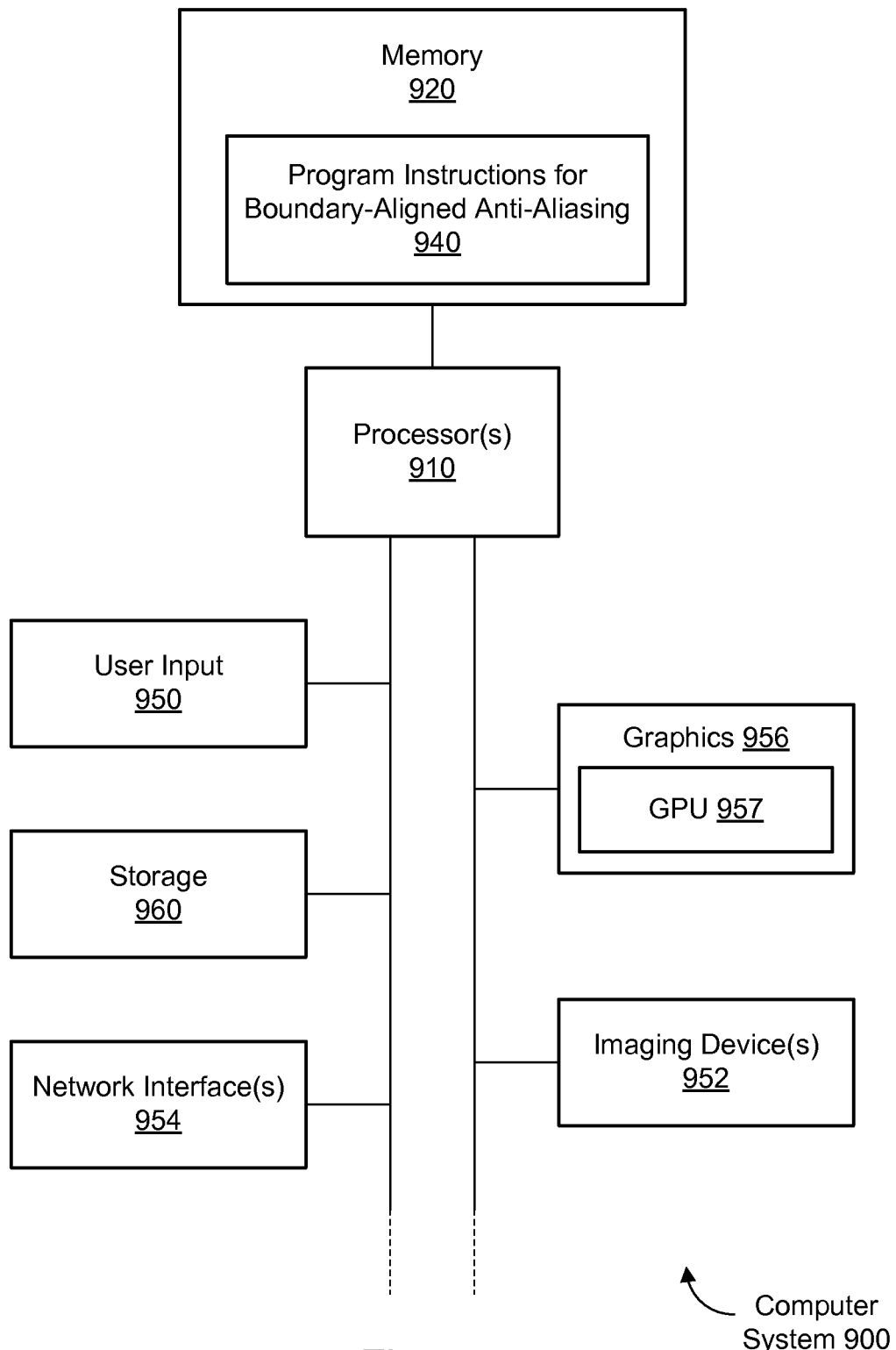
FIG. 5 is a block diagram illustrating constituent elements of a computer system that is configured to implement embodiments of the system, methods, and media for boundary-aligned anti-aliasing.

FIG. 5 is a block diagram illustrating constituent elements of a computer system 900 that is configured to implement embodiments of the system, methods, and media for boundary-aligned anti-aliasing. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU) 957. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. For example, program instructions for boundary-aligned anti-aliasing 940, including portions of the digital image editing program 100 and its constituent elements and data, may be stored in the memory 920. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. The computer system 900 may also include numerous elements not shown in FIG. 5, as illustrated by the ellipsis.

In various embodiments, the elements shown in FIGS. 3 and 4 may be performed in a different order than the illustrated order. In FIGS. 3 and 4, any of the operations described in the elements may be performed programmatically (i.e., by a computer according to a computer program). In FIGS. 3 and 4, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving artwork input comprising a collection of graphical elements, each of which is defined by a plurality of anchor points, wherein each of the anchor points is located at a vertex of the graphical element that it defines;
for each graphical element in the collection, providing a sequential listing consisting of the anchor points that define the graphical element, wherein traversing the anchor points for a given graphical element in an order defined by the sequential listing defines a perimeter of the given graphical element;
for each graphical element in the collection, iterating through the listing of anchor points to make a determination whether the graphical element includes any horizontal or vertical line segments, wherein making the determination comprises comparing a coordinate of a current anchor point with a coordinate of a next anchor point that is consecutive to the current anchor point in the listing and determining whether said coordinates are equal;
defining a first set of one or more graphical elements and a second set of one or more graphical elements, wherein the first set of one or more graphical elements comprises a graphical element that was determined to include a line segment selected from a group consisting of a horizontal line segment and a vertical line segment;
automatically aligning each graphical element in the first set of one or more graphical elements to pixel boundaries based on a pixel resolution of a target imaging device, wherein the one or more graphical elements in the second set are not moved as a result of said automatic alignment;
applying an anti-aliasing function to generate a selectively anti-aliased artwork based on the artwork input, wherein applying the anti-aliasing function comprises applying anti-aliasing effects to the second set of one or more graphical elements and not to the first set of one or more graphical elements; and
displaying the selectively anti-aliased artwork on the target imaging device.

2. The method as recited in claim 1, wherein aligning each graphical element in the first set of one or more graphical elements to pixel boundaries based on the pixel resolution of the target imaging device comprises aligning a stroke boundary of each graphical element in the first set of one or more graphical elements to the pixel boundaries based on the pixel resolution of the target imaging device.

3. The method as recited in claim 2, wherein each graphical element in the first set of one or more graphical elements has a stroke width, and wherein aligning the stroke boundary of each graphical element in the first set of one or more graphical elements to the pixel boundaries based on the pixel resolution of the target imaging device comprises modifying a y coordinate of each respective horizontal line segment having a sum of the y coordinate and half the stroke width that is not a whole number.

4. The method as recited in claim 2, wherein each graphical element in the first set of one or more graphical elements has a stroke width, and wherein aligning the stroke boundary of each graphical element in the first set of one or more graphical elements to the pixel boundaries based on the pixel resolution of the target imaging device comprises modifying an x coordinate of each respective vertical line segment having a sum of the x coordinate and half the stroke width that is not a whole number.

5. The method as recited in claim 2, wherein aligning the stroke boundary of each graphical element in the first set of one or more graphical elements to the pixel boundaries based on the pixel resolution of the target imaging device is based on a stroke alignment of the respective graphical element.

6. The method as recited in claim 1, wherein the second set of one or more graphical elements comprises at least one curve or diagonal line segment.

7. The method as recited in claim 1, wherein the second set of one or more graphical elements comprises at least one additional horizontal or vertical line segment.

8. The method of claim 1, wherein the determination that the graphical element includes a horizontal line segment or a vertical line segment is made in response to identifying two consecutive anchor points in the listing that share a common y coordinate or a common x coordinate, respectively.

9. A system, comprising:
one or more processors;
a target imaging device; and
a memory coupled to the one or more processors and storing program instructions executable by the one or more processors to implement:
receiving artwork input comprising a collection of graphical elements, each of which is defined by a plurality of anchor points, wherein each of the anchor points is located at a vertex of the graphical element that it defines;
for each graphical element in the collection, providing a sequential listing consisting of the anchor points that define the graphical element, wherein traversing the anchor points for a given graphical element in an order defined by the sequential listing defines a perimeter of the given graphical element;
for each graphical element in the collection, iterating through the listing of anchor points to make a determination whether the graphical element includes any horizontal or vertical line segments, wherein making the determination comprises comparing a coordinate of a current anchor point with a coordinate of a next anchor point that is consecutive to the current anchor point in the listing and determining whether said coordinates are equal;

defining a first set of one or more graphical elements and a second set of one or more graphical elements, wherein the first set of one or more graphical elements comprises a graphical element that was determined to include a line segment selected from a group consisting of a horizontal line segment and a vertical line segment;

automatically aligning each graphical element in the first set of one or more graphical elements to pixel boundaries based on a pixel resolution of the target imaging device, wherein the one or more graphical elements in the second set are not moved as a result of said automatic alignment;

applying an anti-aliasing function to generate a selectively anti-aliased artwork based on the artwork input, wherein applying the anti-aliasing function comprises applying anti-aliasing effects to the second set of one or more graphical elements and not to the first set of one or more graphical elements; and displaying the selectively anti-aliased artwork on the target imaging device.

10. The system as recited in claim 9, wherein, in aligning each graphical element in the first set of one or more graphical elements to pixel boundaries based on the pixel resolution of the target imaging device, the program instructions are executable by the one or more processors to implement aligning a stroke boundary of each graphical element in the first set of one or more graphical elements to the pixel boundaries based on the pixel resolution of the target imaging device.

11. The system as recited in claim 10, wherein each graphical element in the first set of one or more graphical elements has a stroke width, and wherein, in aligning the stroke boundary of each graphical element in the first set of one or more graphical elements to the pixel boundaries based on the pixel resolution of the target imaging device, the program instructions are executable by the one or more processors to implement modifying a y coordinate of each respective horizontal line segment having a sum of the y coordinate and half the stroke width that is not a whole number.

12. The system as recited in claim 10, wherein each graphical element in the first set of one or more graphical elements has a stroke width, and wherein, in aligning the stroke boundary of each graphical element in the first set of one or more graphical elements to the pixel boundaries based on the pixel resolution of the target imaging device, the program instructions are executable by the one or more processors to implement modifying an x coordinate of each respective vertical line segment having a sum of the x coordinate and half the stroke width that is not a whole number.

13. The system as recited in claim 10, wherein aligning the stroke boundary of each graphical element in the first set of one or more graphical elements to the pixel boundaries based on the pixel resolution of the target imaging device is based on a stroke alignment of the respective graphical element.

14. The system as recited in claim 9, wherein the second set of one or more graphical elements comprises at least one curve or diagonal line segment.

15. The system as recited in claim 9, wherein the second set of one or more graphical elements comprises at least one additional horizontal or vertical line segment.

16. The system of claim 9, wherein the determination that the graphical element includes a horizontal line segment or a vertical line segment is made in response to identifying two consecutive anchor points in the listing that share a common y coordinate or a common x coordinate, respectively.

17. A non-transitory computer-readable storage medium, storing program instructions computer-executable to implement:

receiving artwork input comprising a collection of graphical elements, each of which is defined by a plurality of anchor points, wherein each of the anchor points is located at a vertex of the graphical element that it defines;

for each graphical element in the collection, providing a sequential listing consisting of the anchor points that define the graphical element, wherein traversing the anchor points for a given graphical element in an order defined by the sequential listing defines a perimeter of the given graphical element;

for each graphical element in the collection, iterating through the listing of anchor points to make a determination whether the graphical element includes any horizontal or vertical line segments, wherein the determination is made in response to identifying two consecutive anchor points in the listing that share a common y coordinate or a common x coordinate;

defining a first set of one or more graphical elements and a second set of one or more graphical elements, wherein the first set of one or more graphical elements comprises a graphical element that was determined to include a line segment selected from a group consisting of a horizontal line segment and a vertical line segment;

automatically aligning each graphical element in the first set of one or more graphical elements to pixel boundaries based on a pixel resolution of a target imaging device, wherein the one or more graphical elements in the second set are not moved as a result of said automatic alignment;

applying an anti-aliasing function to generate a selectively anti-aliased artwork based on the artwork input, wherein applying the anti-aliasing function comprises applying anti-aliasing effects to the second set of one or more graphical elements and not to the first set of one or more graphical elements; and displaying the selectively anti-aliased artwork on the target imaging device.

18. The non-transitory computer-readable storage medium as recited in claim 17, wherein aligning each graphical element in the first set of one or more graphical elements to pixel boundaries based on the pixel resolution of the target imaging device comprises aligning a stroke boundary of each graphical element in the first set of one or more graphical elements to the pixel boundaries based on the pixel resolution of the target imaging device.

19. The non-transitory computer-readable storage medium as recited in claim 18, wherein each graphical element in the first set of one or more graphical elements has a stroke width, and wherein aligning the stroke boundary of each graphical element in the first set of one or more graphical elements to the pixel boundaries based on the pixel resolution of the target imaging device comprises modifying a y coordinate of each respective horizontal line segment having a sum of the y coordinate and half the stroke width that is not a whole number.

20. The non-transitory computer-readable storage medium as recited in claim 18, wherein each graphical element in the first set of one or more graphical elements has a stroke width, and wherein aligning the stroke boundary of each graphical element in the first set of one or more graphical elements to the pixel boundaries based on the pixel resolution of the target imaging device comprises modifying an x coordinate of each respective vertical line segment having a sum of the x coordinate and half the stroke width that is not a whole number.

21. The non-transitory computer-readable storage medium as recited in claim 18, wherein aligning the stroke boundary of each graphical element in the first set of one or more graphical elements to the pixel boundaries based on the pixel resolution of the target imaging device is based on a stroke alignment of the respective graphical element.

22. The non-transitory computer-readable storage medium as recited in claim 17, wherein the second set of one or more graphical elements comprises at least one curve or diagonal line segment.

23. The non-transitory computer-readable storage medium as recited in claim 17, wherein the second set of one or more graphical elements comprises at least one additional horizontal or vertical line segment.

24. The non-transitory computer-readable storage medium as recited in claim 17, wherein applying the anti-aliasing function comprises selectively applying the anti-aliasing function by ignoring or bypassing the first set of one or more graphical elements.

\* \* \* \* \*